United States Patent [19]

Zoppi

[11] Patent Number: 5,391,267

[45] Date of Patent: Feb. 21, 1995

[54] PROCESS FOR THE PRODUCTION OF ALKALI METAL HYDROXIDES AND ELEMENTAL SULFUR FROM SULFUR-CONTAINING ALKALI-METAL SALTS

[75] Inventor: Gianni Zoppi, Dino di Sonvico, Switzerland

[73] Assignee: Ecochem Aktiengesellschaft, Triesen, Liechtenstein

[21] Appl. No.: 111,404

[22] Filed: Aug. 25, 1993

[30] Foreign Application Priority Data

Aug. 25, 1992 [CH] Switzerland ............... 02627/92

[51] Int. Cl.⁶ ............... C25B 1/16; C25B 1/02; C25B 1/00
[52] U.S. Cl. ............... 204/98; 204/128; 204/129
[58] Field of Search ............ 204/98, 128, 129

[56] References Cited

U.S. PATENT DOCUMENTS

| | | | |
|---|---|---|---|
| 4,151,053 | 4/1979 | Seko et al. | 204/296 |
| 4,519,881 | 5/1985 | Chang | 204/149 |
| 5,019,227 | 5/1991 | White et al. | 204/128 |

Primary Examiner—Kathryn Gorgos
Attorney, Agent, or Firm—Cushman Darby & Cushman

[57] ABSTRACT

A process for the production of alkali metal hydroxides, such as caustic soda, and elemental sulfur, characterized in that to an electrochemical cell an aqueous solution of an alkali metal sulfide, e.g., sodium sulfide, is fed in order to cause the following reactions to take place:

at the anode $Na_2S \rightarrow 2Na^+ + S + 2e^-$ at the cathode $2H_2O + 2e^- \rightarrow 2OH^- + H_2$ with the overall reaction being thus the following:

$Na_2S + 2H_2O \rightarrow 2NaOH + S + H_2$.

Elemental sulfur, which is insoluble, is recovered from the anodic solution by filtration. The NaOH solution is extracted from the cathodic compartment by the addition of water. The concentration of the solution of alkali metal hydroxide obtained is a function of the characteristics of the membrane used. The standard potential of the anodic reaction:

$S^{2-} - 2e = S^0$ is lower than of the corresponding processes which led to the development of gases ($Cl_2$, $O_2$), thereby an adavantageous decrease in cell voltage being made possible.

6 Claims, 1 Drawing Sheet

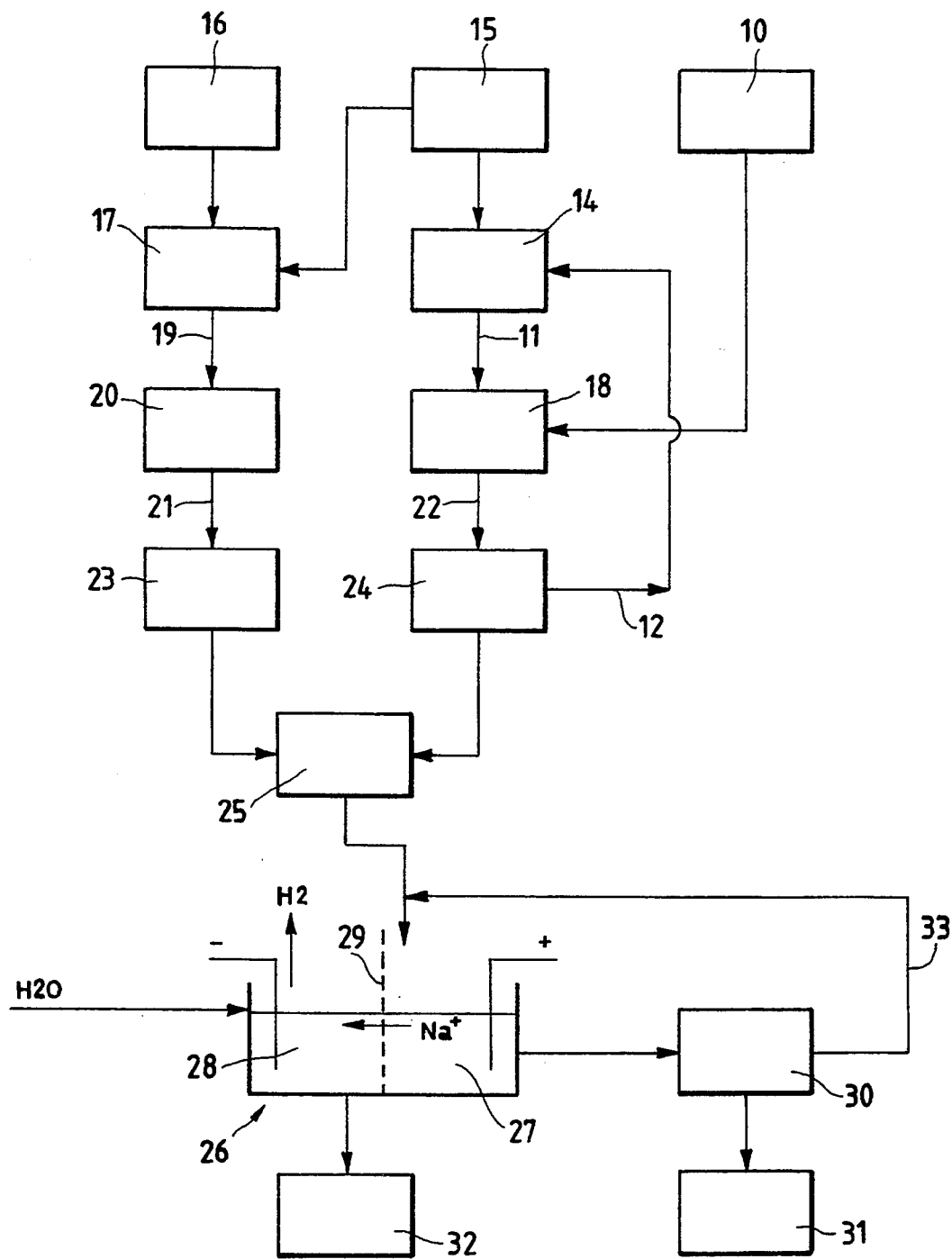

PROCESS FOR THE PRODUCTION OF ALKALI METAL HYDROXIDES AND ELEMENTAL SULFUR FROM SULFUR-CONTAINING ALKALI-METAL SALTS

BACKGROUND OF THE INVENTION

It is well known that sulfur-containing salts of alkali metals, such as, mainly, $Na_2S$, $NaHSO_3$, $Na_2SO_3$, $NaHSO_4$, $Na_2SO_4$, are classified among the indispensable industrial products.

The yearly consumption of such compounds is of the order of millions of tons worldwide.

The production of these salts mostly derives, either directly or indirectly, from sodium chloride, through the production of NaOH or of $Na_2CO_3$, by means of well-known electrochemical or chemical processes.

A large amount of these sulfur-containing alkali metal salts, sometimes larger than the demand, is also available as by-products from several basic industries, such as, e.g., sulfur removal from combustion exhaust gases, petrochemical industry, organic syntheses, man-made fibers, wood industries, recovery of lead batteries, and so forth.

Re-processing these by-products, in order to obtain pure salts to be returned to the manufacturing cycle, not always is advantageous, above all when the salts to be recovered are in the form of more or less concentrated aqueous solutions, and as mixtures with each other.

The concentration and separation costs are often already high enough to void the advantages of the reclaiming operation.

On the other hand, no solutions of these salts, even when diluted, may be disposed of without infringing the environmental laws, unless they are preliminarily submitted to expensive purification or recovery processes.

As mentioned above, such sulfur-containing alkali metal salts mostly derive, other directly or indirectly, from caustic soda.

It is well known that caustic soda is nearly exclusively manufactured by means of sodium chloride electrolysis processes, which also imply the production of the corresponding amount of chlorine gas.

The simultaneous production of both products creates market imbalances when the demands for NaOH and $Cl_2$ are different.

In this regard, it should be observed that in the past years, chlorine demand was larger than for caustic soda, and the latter was regarded nearly as a by-product. During the last few years (and for future years), as a consequence of chlorinated organic solvents banning, the situation is now reversed; at present, caustic soda can be regarded to be the main product; this is mirrored by the international price of this commodity, which has practically doubled over the past five years.

In order to satisfy the increasing demand for NaOH, during the past years, electrodialysis processes were developed in order to produce caustic soda and diluted sulfuric acid from sodium sulfate.

The electrochemical techniques to accomplish this process are sophisticated, both because they require the use of cells with 3 or 4 compartments, as well as owing to the need, due to reasons of energy costs, for depolarizing the anodic reaction with the same hydrogen produced at cathode, by means of the use of hydrogen diffusion anodes, similar to those as used in fuel cells.

Such recent technological solutions, besides being complex, imply the further problem that by-product sulfuric acid is formed, which is formed, which is known to be difficultly traded, also at very low prices.

SUMMARY OF THE INVENTION

On considering the prior art as summarized above, advantages are offered by the present invention, which provides a process for the production of alkali metal hydroxides, such as caustic soda, characterized in that to an electrochemical cell an aqueous solution of an alkali metal sulfide, e.g., sodium sulfide, is fed in order to cause the following reactions, to take place:

at the anode $Na_2S \rightarrow 2Na^+ + S + 2e^-$ 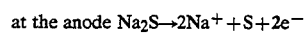

at the cathode $2H_2O + 2e^- \rightarrow 2OH^- + H_2$ 

with the overall reaction thus being the following:

$Na_2S + 2H_2O \rightarrow 2NaOH + S + H_2$. 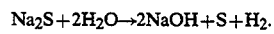

As is better calrified in the following, according to the present invention, for preparing $Na_2S$, as raw material those sulfur-containing sodium salts can be used which are recovered by other industrial cycles, or are won from mining activities.

According to the present invention, in the above electrochemical reaction, the obtained by-product is high-purity elemental sulfur, the potential demand for which is higher than for sulfuric acid and which, by being a solid, non-polluting, low-volume product, can be stored without difficulties.

The electrochemical cell used according to the present invention is simple, because, in it, one single membrane of cationic type is used, which is widely available from the market in different types, and also due to the type of anode which can be adopted, with the anodic reaction taking place at a much lower potential than the corrosion potential of a large number of materials which can be used.

The investment costs for the electrolysis facility are, hence, reduced. This feature makes it possible for facilities to be installed also for relatively small production capacities, without causing the process to lose its economical validity.

BRIEF DESCRIPTION OF THE DRAWING

In order to better understand characteristics and advantages of the present invention, a non-limitative example thereof is disclosed by referring to the accompanying drawing, in which: the sole FIG. is a process flow diagram.

DETAILED DESCRIPTION

Referring to the drawing, in the first step of the exemplified process the sulfur-containing salts of alkali metals can be transformed into an aqueous solution of the alkali metal sulfide.

Inasmuch as, in most cases, the sodium salts (10) to be submitted to the treatment are available as aqueous solutions, in order to avoid the expense for evaporating the accompanying water, as a reclaimable reactant barium sulfide is used, according to the following reactions which take place inside the reactor (18):

$Na_2SO_4 + BaS \rightarrow BaSO_4 + Na_2S$     (1) 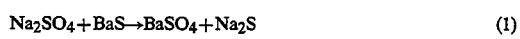

$Na_2SO_3 + BaS \rightarrow BaSO_3 + Na_2S$     (2) 

$$NaHSO_3 + NaOH + BaS \rightarrow BaSO_3 + Na_2S + H_2O \quad (3)$$

The insoluble barium sulfates and/or sulfites (12), separated by filtration (24) from the solutions of sodium sulfite, are thermally reduced in (14) with coal (15) according to the reactions (4) and (5), in order to produce again barium sulfide (11) which is recycled to the above defined double decomposition reactions (1), (2) and (3), as defined above.

$$BaSO_4 + 4C \rightarrow BaS + 4CO \quad (4)$$

$$BaSO_3 + 3C \rightarrow BaS + 3CO \quad (5)$$

In the case when the sulfur-containing sodium salts are available in solid form (16), the direct reduction (17) to sulfide according to the following known reactions:

$$Na_2SO_4 + 4C \rightarrow Na_2S + 4CO \quad (6)$$

$$Na_2SO_3 + 3C \rightarrow Na_2S + 3CO \quad (7)$$

can be used.

Sodium sulfide (19) is prepared in aqueous solution in the dissolver (20).

The sodium sulfide solution (21) or (22) obtained by means of a whatever one of both processes disclosed above, filtered in (23) or (24), is ready in (25) to be fed to an electrolytic cell (26).

The concentration of sodium sulfide solution will be a function of the initial concentration of sodium salt used as the starting material, preferably not lower than 100 g/l.

The anolyte (27) of the electrolytic cell is constituted by a concentrated solution of $Na_2SO_4$ or of other sodium salts, e.g. sodium polysulfide, which acts as a support electrolyte in order to secure good conductivity.

In the anolyte, under steady state conditions, sodium sulfide will be present, the concentration of which is a function of the cell operating conditions.

The catholyte (28) is a solution of NaOH having the maximal concentration as allowed by the type of cationic membrane (29) used.

The feed of $Na_2S$ into the anolyte (27) is controlled by the amount of electrical current flowing through the cell, and, hence, corresponds to the amount of NaOH produced.

Inside the cell (26), the following reactions take place:

at the anode: $Na_2S \rightarrow 2Na^+ + S^0 + 2e$ migration: $2Na^+_{an} \rightarrow 2Na^{30}_{cat}$ at the cathode: $2H_2O + 2e \rightarrow 2OH^- + H_2$ Overall reaction: $Na_2S + 2H_2O \rightarrow H_2 + S^0 + 2NaOH$ Under steady state conditions, in the abolyte sodium polysulfide $Na_2S_x$ will be always present, with x comprised within the range of from 1 to 8, as a function of the pH value and of the operating temperature.

The decrease in cell voltage as compared to the anodic systems with gas development, is secured by the low necessary potential in order to oxidize $S^{2-}$ to yield $S^0$.

In order to reduce the threshold concentration of $Na_2S$ and the anodic polarization, the anolyte contains a homogeneous catalyst the oxidation potential of which is comprised between the potential of the oxidation of $S^{2-}$ to $S^0$, and the potential of water oxidation reaction $$H_2O \rightarrow 2H^+ + \tfrac{1}{2} O_2 + 2e.$$

If, for example, NaI, which has extremely high oxidation kinetics, is used, the process is as follows:

| * at the anode: | 2NaI | $\rightarrow 2Na^+ + I_2 + 2e$ |
|---|---|---|
| * in solution: | $I_2 + Na_2S +$ | $\rightarrow 2NaI + S^0$ |
| * Total reaction: | $Na_2S$ | $\rightarrow 2Na^+ + S^0 + 2e$ |

By using the catalyst as disclosed above, also, the main reaction takes place with so high kinetics that one can operate at high current densities and, with an even not high amount of $Na_2S$ in solution in the anolite, with the pair of $2I^-/I_2$ operating as a catalyst, the anodic voltage becomes close to the values of $S^{2-} \rightarrow S^0 + 2e$ potential.

Sulfur which precipitates in the anolyte as an extremely fine crystalline material is recovered in (31) in continuous by filtration (30). The presence of sulfur in the anolite has no influence on the anode, or on the membrane. The anolyte is recycled to the cell through the line (33).

The caustic soda solution is recovered continuously in (32) by adding $H_2O$ to the catholyte loop, as it occurs in chlorine/sodium hydroxide production cells.

In the following, an example is reported which relates, in particular, to the amounts of concerned products, in an embodiment of a process according to the present invention.

EXAMPLE

An amount 1000 g of $Na_2SO_4$ crystals were mixed with 350 g of coal powder and were charged to a graphite crucible which was then heated up to 1000° C. After a 15-minute reaction time, when it was just starting to lose fluidity, the reaction mass was cast into a cast-iron mold and was let cool.

The cooled reaction mass was subsequently dissolved in water, with, after filtration, a solution being obtained which contained 160 g/l of $Na_2S$.

This solution was fed at the flow rate of 180 ml/h into the anodic compartment of a cell with a Nafion 324 cationic membrane which is a single membrane permeable for alkali metal cations, particularly sodium cations, in order to produce a theoretical amount of 29.5 g/h of NaOH.

The capacity of each compartment was of 2.5 liters and the anolyte initially contained 200 g/l of $Na_2SO_4$, acting as the support electrolyte, while the catholyte was a solution of 200 g/l of NaOH. Cathode and anode consisted of a stainless steel AISI 304 plate and were installed spaced apart 30 mm from each other.

The anodic current density was of 3000 A/m². During a certain initial time period, the cell operated without the presence of $Na_2S$ in the anolyte until the system reached its stability.

During this time period, the cell operated with oxygen evolving at the anode.

Now, by adding 10 g/l of $Na_2S$ to the anodic compartment, the gas evolution disappeared and a decrease in cell voltage of 0.9 V was recorded.

The further addition of 5 g/l of NaI to the same compartment caused a further decrease of 0.1 V in cell voltage.

Under these conditions, which were kept constant by means of calculated additions of Na₂S solution to the anolyte and of water to the catholyte, the cell was caused to operate for 7 hours and 30 minutes, with a total amount of electrical charge of 148.5 Ah being caused to flow through it, 171.7 g of Na₂S being consumed and
190.6 g of NaOH
69.6 g of elemental S
being produced.

At the end of the test, the anode of AISI 304 did not show any visible corrosion symptoms.

Therefore, from the above, it may be concluded in general that the advantages over the process known from the prior art for producing NaOH from sulfur-containing sodium salts with production of H₂SO₄ at the anode, are the following:

The electrolysis cell is much simpler, because no anionic membranes are necessary.

The anodes can be made from less expensive materials than the suitable anodes for O₂ development or H₂ diffusion anodes.

The purity of the solutions of alkali metal salts to be so treated, in particular the presence of heavy metals and of Ca and Mg is not a limitative factor because, by operating in a neutral or alkaline environment, in the presence of S²⁻ ions. all heavy metals are precipitated. Also, Ca and Mg are insoluble in relatively concentrated solutions of sodium sulfide. Therefore, fine purification with resins is not necessary.

The cell voltage is considerably decreased owing to the smaller number of present membranes and due to the reduced standard potential of the anodic reaction, on the kinetics of which the catalyst acts favourably.

The main product is sodium hydroxide, the by-product is elemental sulfur, which causes less serious problems as regards sale and storage, than sulfuric acid, produced by the other processes.

The process according to the present invention has been specifically disclosed with reference to caustic soda. However, it can be similarly extended to other alkali metal hydroxides, by starting from the corresponding alkali metal sulfide.

I claim:

1. A process for producing alkali metal hydroxide and elemental sulfur, comprising:
   (a) providing an electrochemical cell having a single membrane permeable for alkali metal cations, separating an anodic compartment from a cathodic compartment, so that the alkali metal cation can migrate from the anodic compartment to the cathodic compartment;
   (b) charging the anodic compartment with a concentrated solution of an alkali mental salt also containing a homogeneous catalyst with an oxidation potential which is between the oxidation potential of the reaction $$S^{2-} - 2e^- \rightarrow S^0$$

and the oxidation potential of the reaction $$H_2O \rightarrow 2H^+ + \tfrac{1}{2}O_2 + 2e^-,$$

as an anolyte;
   (c) charging the cathodic compartment with an alkali metal hydroxide solution, as a catholyte;
   (d) applying an electrical potential across an anode of the anodic compartment and a cathode of the cathode compartment for operating the cell; and
   (e) feeding an alkali metal sulfide to the anodic compartment and continuing to conduct step (d).

2. The process of claim 1, wherein:
said alkali metal salt is a sodium salt, said alkali metal hydroxide is NaOH, and said alkali metal sulfide is sodium sulfide, so that as step (e) is conducted, the following reactions occur in the cell at the anode: $Na_2S \rightarrow 2Na^+ + S + 2e^-$ at the cathode: $2H_2O + 2e^- \rightarrow 2OH^- + H_2$ for an overall reaction $$Na_2S + 2H_2O \rightarrow 2NaOH + S + H_2.$$

3. The process according to Claim 4, wherein: said catalyst is NaI, with the following reactions:

| | | |
|---|---|---|
| * at the anode: | 2NaI | $\rightarrow 2Na^+ + I_2 + 2e$ |
| * in solution: | $I_2 + Na_2S +$ | $\rightarrow 2NaI + S^0$ |
| * Total reaction: | $Na_2S$ | $\rightarrow 2Na^+ + S^0 + 2e$ | occurring.

4. The process according to claim 1, wherein: the sulfur-containing anolyte formed at the anode is separated from it by filtration and is recycled to the electrochemical cell.

5. The process according to claim 1, wherein: said sodium sulfide is prepared by starting from sodium salts in aqueous solution, by means of double decomposition reactions with barium sulfide:

$$Na_2SO_4 + BaS \rightarrow BaSO_4 + Na_2S \quad (1)$$

$$Na_2SO_3 + BaS \rightarrow BaSO_3 + Na_2S \quad (2)$$

$$NaHSO_3 + NaOh + BaS \rightarrow BaSO_3 + Na_2S + H_2O \quad (3)$$

with the insoluble barium sulfates and sulfites, separated by filtration from the solutions of sodium sulfide, being thermally reduced with coal according to the following reactions (4) and (5), to regenerate barium sulfide which is recycled to the above said double decomposition reactions (1), (2) and (3):

$$BaSO_4 + 4C \rightarrow BaS + 4CO \quad (4)$$

$$BaSO_3 + 3C \rightarrow BaS + 3CO \quad (5).$$

6. The process according to claim 1, wherein: said sodium sulfide is prepared from sodium salts in solid form by means of direct reduction to sulfide according to the following reactions:

$$Na_2SO_4 + 4C \rightarrow Na_2S + 4CO \quad (6)$$

$$Na_2SO_3 + 3C \rightarrow Na_2S + 3CO \quad (7).$$

* * * * *